United States Patent
Volkening et al.

(10) Patent No.: US 7,710,979 B2
(45) Date of Patent: May 4, 2010

(54) ATM BONDING

(75) Inventors: Ingo Volkening, Singapore (SG); Jiaxiang Shi, Singapore (SG); Chunfeng Hu, Singapore (SG)

(73) Assignee: Infineon Technologies AG, Munich (DE)

( * ) Notice: Subject to any disclaimer, the term of this patent is extended or adjusted under 35 U.S.C. 154(b) by 1567 days.

(21) Appl. No.: 10/987,436

(22) Filed: Nov. 12, 2004

(65) Prior Publication Data

US 2006/0104315 A1 May 18, 2006

(51) Int. Cl. *H04L 12/56* (2006.01)
(52) U.S. Cl. .................. 370/395.6; 370/535
(58) Field of Classification Search .......... None
See application file for complete search history.

(56) References Cited

U.S. PATENT DOCUMENTS

| | | | |
|---|---|---|---|
| 6,683,887 B1 * | 1/2004 | Huang et al. | 370/466 |
| 7,009,977 B1 * | 3/2006 | Ewell et al. | 370/395.1 |
| 7,164,694 B1 * | 1/2007 | Nodoushani et al. | 370/467 |
| 7,295,566 B1 * | 11/2007 | Chiu et al. | 370/419 |
| 2003/0091053 A1 * | 5/2003 | Tzannes et al. | 370/395.1 |
| 2004/0146072 A1 * | 7/2004 | Farmwald | 370/537 |
| 2005/0030974 A1 * | 2/2005 | Wright et al. | 370/468 |
| 2005/0152370 A1 * | 7/2005 | Meehan et al. | 370/393 |
| 2005/0152385 A1 * | 7/2005 | Cioffi | 370/420 |
| 2005/0157664 A1 * | 7/2005 | Baum et al. | 370/256 |
| 2005/0286424 A1 * | 12/2005 | Peeters et al. | 370/235 |
| 2006/0069772 A1 * | 3/2006 | Clark | 709/225 |
| 2007/0041408 A1 * | 2/2007 | Kang | 370/536 |
| 2007/0086477 A1 * | 4/2007 | Xiong et al. | 370/463 |

FOREIGN PATENT DOCUMENTS

KR 2002052022 A 11/2002

OTHER PUBLICATIONS

*White Paper: Bonded ADSL2+New Standards for Multi-Line Services.* Aware, Inc., Jun. 2004. pp. 1-8. (10 Pages).

* cited by examiner

*Primary Examiner*—Kevin C Harper
*Assistant Examiner*—Rhonda Murphy
(74) *Attorney, Agent, or Firm*—Maginot, Moore & Beck

(57) ABSTRACT

There is provided an apparatus and method for ATM bonding. The apparatus comprises a first unit having a first xDSL line connected thereto, a second unit having a second xDSL line connected thereto and a connection between the first unit and the second unit. The first unit is arranged to convert one incoming ATM datastream to a plurality of data and to convert a plurality of incoming data to one ATM data stream. The first unit is arranged to implement the ATM bonding layer of the ATM protocol. The second unit may be arranged to implement one or more of the higher layers. The method comprises the steps of: a first unit receiving an ATM data stream; the first unit converting the ATM data stream into a plurality of data; the first unit transmitting a first one of the plurality of data over a first xDSL line connected to the first unit; the first unit sending a second one of the plurality of data to a second unit via a connection; and the second unit transmitting the second one of the plurality of data over a second xDSL line connected to the second unit.

14 Claims, 5 Drawing Sheets

ATM BONDING

FIELD OF THE INVENTION

The invention relates to an apparatus and method for ATM bonding.

BACKGROUND OF THE INVENTION

ATM bonding is a well known process which is used to achieve a high bandwidth by combining separate channels of lower bandwidth. Multiple independent channels may be aggregated (bonded) across an ATM network to create one higher rate channel. High rate channels are becoming increasingly required for high data rate applications like video delivery.

The ATM bonding may be achieved by inverse multiplexing over ATM (IMA or IMA+). Essentially the process is as follows. On the transmitting side, outgoing ATM traffic enters the inverse multiplexer and is spread over the plurality of data channels using a bonding protocol (e.g. round robin method). On the receiving side, for traffic incoming on the plurality of data channels, the inverse multiplexer combines the data on the separate channels into ATM traffic for moving towards the higher layer protocols.

Note that IMA+ works in a similar way to IMA but is a recent development which somewhat simplifies IMA functions. Throughout the specification, when the term IMA is used, it should be understood that IMA+ may equally apply.

As is well known, synchronization must be handled carefully with ATM bonding. Firstly, the inverse multiplexer at the receiving end must recombine the incoming traffic in the same order in which the inverse multiplexer on the transmitting end sent the traffic over the separate lines, so that the resulting ATM data stream is an exact replica of the original ATM data stream. In addition, since different pieces of incoming data will have traveled over different lines, different delays may be encountered and the inverse multiplexer on the receiving end must take account of this when recombining the incoming traffic.

The plurality of channels used for the lowest layer protocol are typically xDSL channels. ATM bonding over xDSL is challenging because several xDSL channels must be combined into one common ATM layer, which involves ATM cell aggregation and cell splitting. ATM QoS should, meanwhile, be maintained.

FIG. 1 shows a known way to realize ATM bonding. In this example, there are four xDSL channels bonded across a single ATM network. Incoming xDSL traffic on lines 101a, 101b, 101c and 101d is received by xDSL chips 103a, 103b, 103c and 103d respectively. Each xDSL chip 103a, 103b, 103c, 103d is connected to a network processor 105 via a UTOPIA interface 107. A UTOPIA interface is a well-known interface commonly used in ATM networks and need not be described further. The network processor transmits and receives data through an Ethernet (or similar) interface.

In the arrangement of FIG. 1, the xDSL chips 101a, 101b, 101c and 101d implement only the lowest PHY layer of the ATM protocol. That is, each xDSL chip simply receives incoming data on its xDSL line and sends it to the network processor, or receives data from the network processor and sends it out over its xDSL line. The ATM bonding layer (i.e. the combining of separate pieces of incoming data, from the xDSL lines, into one ATM data stream) as well as all higher layer protocols (including the ATM layer and AAL5 layer) are implemented by the network processor 105.

Thus, in the arrangement of FIG. 1, the network processor 105 handles the bonding protocol as well as all the networking functionalities, such as network access and routing. This means that the massive processing power of the network processor is largely occupied by the bonding, which means that the network processor is heavily overloaded and the resources are not well optimized. In addition, xDSL chips with a UTOPIA interface are becoming are becoming less and less available. Also, the UTOPIA interface provides limited scalability and, because the UTOPIA interface does not contain control protocol, data and control functions need to be split. In addition, UTOPIA only supports one master on the bus system.

SUMMARY OF THE INVENTION

It is an object of the invention to provide an apparatus and method for ATM bonding which mitigates or substantially overcomes the problems of prior art arrangements described above.

In general terms the invention proposes that the ATM bonding processes be offloaded from a main system master unit to a separate bonding master unit. The bonding master unit deals with the bonding processes whilst the system master unit handles other functionalities including the networking functionalities such as network access and routing. A xDSL line is connected to each of the system master unit and the bonding master unit for receiving and transmitting xDSL data.

More specifically, according to the invention, there is provided apparatus for ATM bonding, the apparatus comprising:

a first unit having a first xDSL line connected thereto;

a second unit having a second xDSL line connected thereto; and a connection between the first unit and the second unit, the first unit being arranged to convert one incoming ATM datastream to a plurality of outgoing data and to convert a plurality of incoming data to one outgoing ATM datastream.

With this arrangement the ATM bonding processes are handled within the first unit. The apparatus can be used for ATM based xDSL bonding without any modification.

Preferably the first xDSL line is directly connected to the first unit with no separate unit being required. In that case, there is preferably a transmitting/receiving block within the first unit for transmitting and receiving xDSL data over the first xDSL line. Also, in that case, the direct connection means that xDSL data can travel directly between the first unit and the xDSL line without, for example, travelling via the connection. Thus, the first unit is arranged to implement the lowest protocol layer (PHY) over the first xDSL line and also to implement the ATM bonding protocol layer. The two protocol layers are implemented by the same unit, without a separate PHY unit being required.

Preferably, the second xDSL line is directly connected to the second unit with no separate unit being required. In that case, there is preferably a transmitting/receiving block within the second unit for transmitting and receiving xDSL data over the second xDSL line. Also, in that case, the direct connection means that xDSL data can travel directly between the second unit and the xDSL line without, for example, travelling via the connection.

Preferably, the first unit is arranged to transmit and receive xDSL data over the first xDSL line.

In an embodiment of the invention, the first unit is arranged to convert one incoming ATM data stream to a plurality of data and to transmit a first one of the plurality of data over the first xDSL line. In that embodiment, the first unit is preferably arranged to send a second one of the plurality of data to the second unit via the connection. In that embodiment, the second unit is preferably arranged to transmit the second one of the plurality of data over the second xDSL line. Thus, in that embodiment, ATM data incoming to the first unit is spread over two xDSL channels and transmitted over the two xDSL lines, the first xDSL line being connected to the first unit, the second xDSL line being connected to the second unit.

In an embodiment of the invention, the first unit is arranged to receive a plurality of incoming data, a first one of the plurality of data being received over the first xDSL line, and to convert the plurality of data to one ATM data stream. In that embodiment, the first unit is preferably arranged to receive a second one of the plurality of data from the second unit via the connection. In that embodiment, the second unit is preferably arranged to receive the second one of the plurality of data over the second xDSL line. Thus, in that embodiment, data is received over the first and second xDSL lines connected to the first and second units respectively and is converted to one ATM datastream in the first unit.

Advantageously, the second unit is arranged to transmit and receive xDSL data over the second xDSL line.

Even more advantageously, the second unit is arranged to receive data over the second xDSL line and send it to the first unit via the connection and to receive data from the first unit via the connection and transmit it over the second xDSL line.

The second unit may be directly or indirectly connected to a user unit. The second unit may be arranged to connect to a network. The second unit may be arranged to handle networking functionalities. The second unit may comprise a user interface.

In one embodiment of the invention, the apparatus further comprises a third unit having a third xDSL line connected thereto. In that embodiment, the third unit may be arranged to receive data over the third xDSL line and send it to the first unit via the connection and to receive data from the first unit via the connection and transmit it over the third xDSL line. In this embodiment, the first unit may be arranged to spread incoming ATM data over three xDSL channels for transmission over the first, second and third xDSL lines Similarly, the first unit may be arranged to receive three data streams over the three xDSL lines and to convert those three data streams to a single ATM data stream.

In one embodiment of the invention, the apparatus further comprises a fourth unit having a fourth xDSL line connected thereto. In that embodiment, the fourth unit may be arranged to receive data over the fourth xDSL line and send it to the first unit via the connection and to receive data from the first unit via the connection and transmit it over the fourth xDSL line. In this embodiment, the first unit may be arranged to spread incoming ATM data over four xDSL channels for transmission over the first, second, third and fourth xDSL lines. Similarly, the first unit may be arranged to receive four data streams over the four xDSL lines and to convert those four data streams to a single ATM data stream.

The apparatus may comprise further units having further xDSL lines connected thereto. Thus, for the case of n units, each unit having its own xDSL line, the first unit may be arranged to spread incoming ATM data over n xDSL channels for transmission over the n xDSL lines. Similarly, the first unit may be arranged to receive n data streams over the n xDSL lines and to convert those data streams to a single ATM data stream. In some applications, the maximum value of n is 32.

In one embodiment of the invention, the first and second units are on one chip.

In another embodiment of the invention, each unit is on a separate chip. Thus the first unit is on one chip, the second unit is on another chip and any further units are each on their own chip. Those chips may comprise identical hardware, the different modes being configured by software. In that way, ATM cells may be stored at any location within the apparatus. (Note that, with the known UTOPIA structure, all the traffic must go to the network processor.) One or more of the chips may be a xDSL CPE chip. One or more of the chips may be an AMAZON chip, AMAZON being a trade mark of the assignee of the present invention.

Preferably, the connection is a PCI (Peripheral Component Interface) bus. A PCI bus provides high availability and flexibility and is a widely accepted standard for interconnecting chips.

According to the invention, there is also provided apparatus for ATM bonding, the apparatus comprising:

a bonding master unit having a first xDSL line directly connected thereto;

a system master unit having a second xDSL line directly connected thereto, the system master unit being arranged to be connected to a user unit;

a bus connecting the bonding master unit and the system master unit, the bonding master unit being arranged to convert one incoming ATM data stream to at least two data streams for transmitting on the first and second xDSL lines respectively and to convert at least two data streams incoming on the first and second xDSL lines respectively to one ATM data stream.

The system master may be arranged to be connected either directly or indirectly to a user unit. For example, the system master may comprise a user interface and/or the system master may connect to a network.

According to the invention, there is further provided apparatus for ATM bonding, comprising:

a bonding master unit having a first connection line connected thereto;

a system master unit having a second connection line connected thereto; and a bus connecting the bonding master unit and the system master unit, wherein the bonding master unit and the system master unit are arranged to implement the lowest ATM protocol layer, the bonding master unit is arranged to implement the ATM bonding protocol layer and the system master unit is arranged to implement a higher protocol layer.

Thus, for a protocol extending from the lowest PHY layer to the highest layer with intermediate layers including an ATM bonding layer (for bonding processes), the highest protocol is implemented on the system master unit, the lowest protocol is implemented on the system master unit and the bonding master unit and the intermediate ATM bonding protocol is implemented on the bonding master unit.

The invention (in all its aspects) is not restricted to xDSL connections at the lowest physical layer. The ATM bonding may be used over any physical layer. Some possible examples are ADSL, ADSL2 and ADSL2+.

According to the invention, there is further provided a method for ATM bonding, the method comprising the steps of:

a) a first unit receiving an ATM data stream;

b) the first unit converting the ATM data stream into a plurality of data;

c) the first unit transmitting a first one of the plurality of data over a first xDSL line connected to the first unit;

d) the first unit sending a second one of the plurality of data to a second unit via a connection; and e) the second unit transmitting the second one of the plurality of data over a second xDSL line connected to the second unit.

The second unit may be arranged to be directly or indirectly connected to a user unit. The second unit may be arranged to connect to a network. The second unit may be arranged to handle networking functionalities. The second unit may comprise a user interface.

In one embodiment, step a) of the first unit receiving an ATM data stream comprises the first unit receiving the ATM data stream from the second unit.

The method may further comprise the steps of:
the first unit sending a third one of the plurality of data to a third unit via the connection; and
the third unit transmitting the third one of the plurality of data over a third xDSL line connected to the third unit.

The method may further comprise the steps of:
the first unit sending a fourth one of the plurality of data to a fourth unit via the connection; and
the fourth unit transmitting the fourth one of the plurality of data over a fourth xDSL line connected to the fourth unit.

The first and second units may be on one chip. Alternatively, each unit may be on a separate chip.

Preferably, the connection is a PCI bus.

According to the invention, there is further provided a method for ATM bonding, the method comprising the steps of:

a) a first unit receiving first data over a first xDSL line connected to the first unit;

b) a second unit receiving second data over a second xDSL line connected to the second unit;

c) the second unit sending the second data to the first unit via a connection;

d) the first unit converting the first and second data to one ATM data stream; and e) the first unit transmitting the ATM data stream.

The second unit is preferably arranged to be directly or indirectly connected to a user unit.

Step e) of the first unit transmitting the ATM data stream may comprise the first unit transmitting the ATM data stream to the second unit.

The method may further comprise the steps of:
a third unit receiving third data over a third xDSL line connected to the third unit; and
the third unit sending the third data to the first unit via the connection.

The may further comprise the steps of:
a fourth unit receiving fourth data over a fourth xDSL line connected to the fourth unit; and
the fourth unit sending the fourth data to the first unit via the connection.

The first and second units may be on one chip. Alternatively, each unit may be on a separate chip.

The connection may be a PCI bus.

Any feature described in relation to one aspect of the invention may also apply to any other aspect of the invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, of which

DETAILED DESCRIPTION OF PREFERRED EMBODIMENTS

Figure 1:
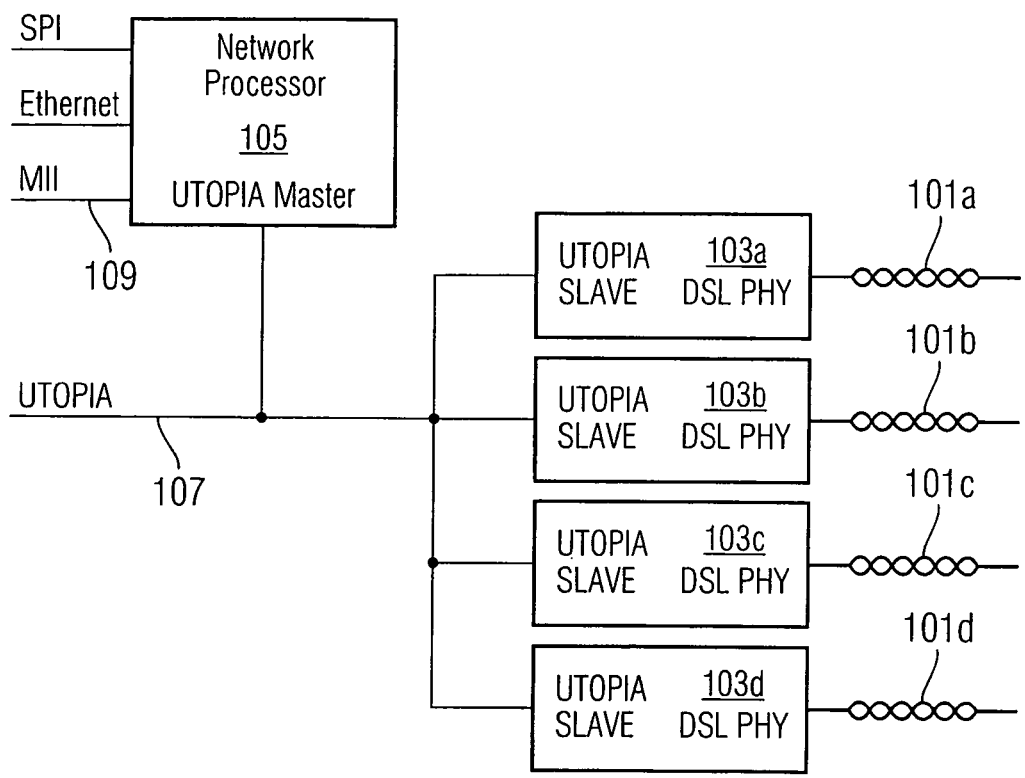
FIG. 1 is a diagram showing a known way of realizing ATM bonding over xDSL.

FIG. 1 shows a known way to realize ATM bonding over xDSL and has already been described.

Figure 2:
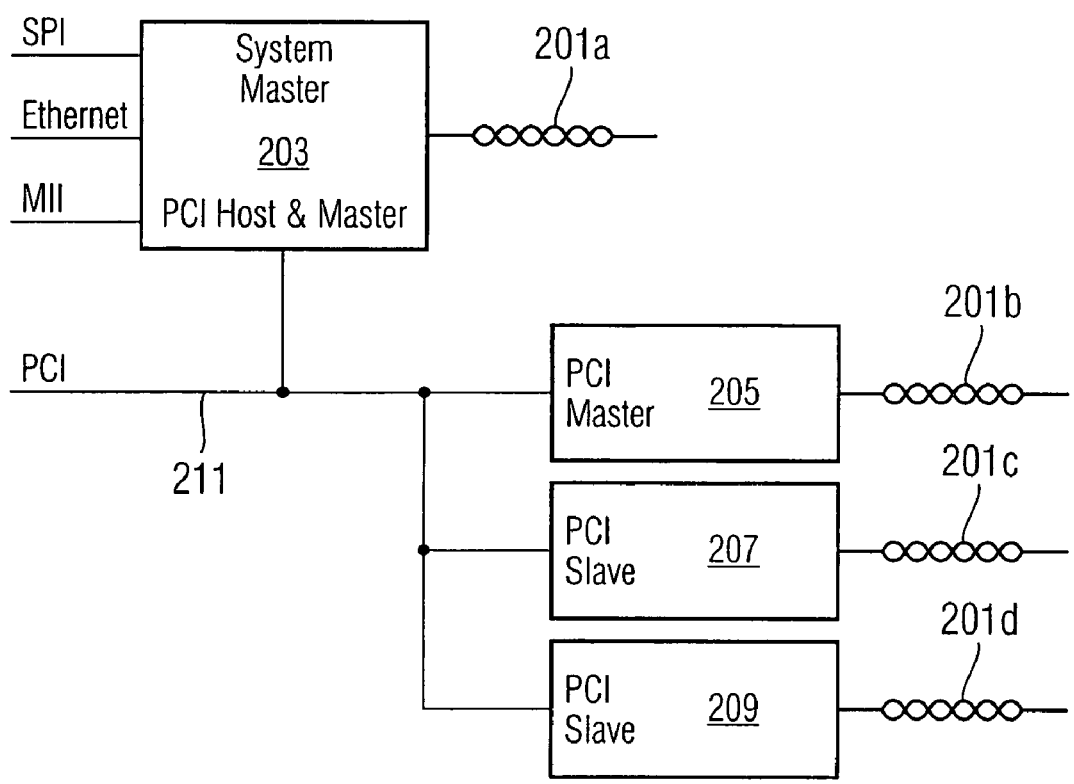
FIG. 2 is a diagram showing a way of realizing ATM bonding over xDSL in accordance with the invention.

FIG. 2 shows how the invention realizes ATM bonding over xDSL by a PCI based chip connection. In FIG. 2, there are four xDSL channels bonded across a single ATM network. xDSL traffic is incoming and outgoing over four lines 201a, 201b, 201c and 201d. Line 201a is received by the second unit in the form of a System master 203, line 201b is received by the first unit in the form of an Bonding master 205, line 201c is received by the third unit in the form of a first Bonding slave 207 and line 201d is received by the fourth unit in the form of a second Bonding slave 209. It will be understood by the skilled person that for more than four xDSL channels, the additional channels would be inputted and outputted by further Bonding slaves. Similarly, for three xDSL channels, the arrangement would include only one Bonding slave (together with the Bonding master and System master) and for two xDSL channels, the arrangement would include no Bonding slaves (only the Bonding master and System master).

Thus, in this arrangement, there are three defined system components the System master, the Bonding master and the Bonding slaves. They are connected to one another via a PCI bus 211 of a type well known in the art.

Consider the operation of the architecture of FIG. 2 according to a first embodiment of the invention.

Firstly, let's consider traffic incoming over the four xDSL lines 201a, 201b, 201c and 201d, i.e. downstream traffic;

xDSL data on line 201a is received by the System master 203. The System master 203 converts the xDSL data to ATM data and that ATM data is directed to the Bonding master 205 via the PCI bus 211. For this purpose, the System master is implementing only the lowest PHY protocol in the ATM protocol. That is, the System master 203 simply receives incoming xDSL data on line 201a, converts it to ATM (in the Transmission Convergence (TC) sublayer) and sends it to the Bonding master 205.

xDSL data on line 201c is received by the first Bonding slave 207. The first Bonding slave 207 converts the xDSL data to ATM data and that ATM data is directed to the Bonding master 205 via the PCI bus 211. The first Bonding slave implements only the lowest PHY protocol in the ATM protocol. That is, the first Bonding slave 207 simply receives incoming xDSL data on line 201c, converts it to ATM in its TC sublayer and sends it to the Bonding master 205.

xDSL data on line 201d is received by the second Bonding slave 209, which works in the same way as the first Bonding slave 207. The second Bonding slave 209 converts the xDSL data to ATM data and that ATM data is directed to the Bonding master 205 via the PCI bus 211. The second Bonding slave, like the first Bonding slave, implements only the lowest PHY protocol in the ATM protocol. That is, the second Bonding slave 209 simply receives incoming xDSL data on line 201d, converts it to ATM in its TC sublayer and sends it to the Bonding master 205.

Any further Bonding slaves (for more than four xDSL channels) would work in a similar manner.

xDSL data on line 201b is received directly into the Bonding master and converted in its TC sublayer to ATM data The Bonding master therefore receives data from all four xDSL channels, data from channels 201a, 201c and 201d coming in via the System master 203, the first Bonding slave 207 and the second Bonding slave 209 respectively and data from channel 201b coming in directly to the Bonding master 205. The Bonding master then performs the necessary bonding protocol to combine the separate strands of ATM data into a single ATM data stream (as usual with ATM bonding, taking account of delays to ensure that the ATM data stream matches the original ATM data stream) i.e. the Bonding master implements the ATM bonding protocol. The Bonding master then sends the ATM data to the System master via the PCI bus. The System master then processes the ATM data and converts them to higher layer data, such as Ethernet and outputs the ATM data over the appropriate user interface or network (Ethernet, MII, SPI etc). For this purpose, therefore, the System master is implementing the ATM protocol, the AAL5 protocol and all higher layers in the internetworking applications.

Secondly, let's consider traffic outgoing over the four xDSL lines 201a, 201b, 201c and 201d, i.e. upstream traffic.

Data is received by the System master 203 from, for example, the Ethernet. The System master processes the data and sends the processed ATM data to the Bonding master 205 via the PCI bus 211. Thus, for this purpose, the System master 203 is implementing the ATM protocol, the AAL5 protocol and all higher layers. The Bonding master 205 is responsible for the bonding protocol i.e. the Bonding master splits the ATM data up to spread it over the four available xDSL channels. Thus, the Bonding master implements the ATM bonding protocol. (It should be understood that, if there were more or fewer xDSL channels available, the Bonding master would spread the data over the appropriate number of xDSL channels.)

The Bonding master 205 sends ATM data for one of the channels to the System master 203 via the PCI bus 211. The System master 203 converts it to xDSL in its TC sublayer and transmits the xDSL data on xDSL line 201a. For this purpose the System master 203 is implementing only the lowest PHY protocol in the ATM protocol. That is, the System master 203 simply receives data from the Bonding master 205 and transmits it over the xDSL line 201a.

The Bonding master sends ATM data for another of the channels to the first Bonding slave 207 via the PCI bus 211. The first Bonding slave 207 converts it to xDSL in its TC sublayer and transmits the xDSL data on xDSL line 201c. The first Bonding slave implements only the lowest PHY protocol in the ATM protocol. That is, the first Bonding slave simply receives data from the Bonding master 205 and transmits it over the xDSL line 201c.

The Bonding master sends ATM data for another of the channels to the second Bonding slave 209 via the PCI bus 211. The second Bonding slave 209 converts it to xDSL in its TC sublayer and transmits the xDSL data on xDSL line 201d. Like the first Bonding slave, the second Bonding slave implements only the lowest PHY protocol in the ATM protocol. That is, the second Bonding slave simply receives data from the Bonding master 205 and transmits it over the xDSL line 201d.

Any further Bonding slaves (for more than four xDSL channels) would work in a similar manner.

The Bonding master transmits data for the last of the four channels directly onto xDSL line 201b.

Thus, it may be seen that, for the operation of the first embodiment, the lowest PHY protocol in the ATM protocol is implemented by the System master, the Bonding master and each of the Bonding slaves. The next protocol, the ATM bonding protocol is being implemented by the Bonding master as it spreads the ATM data over the four xDSL channels or recombines the data from the four xDSL channels into a single ATM data stream. The ATM protocol, the AAL5 protocol and all higher layers are implemented by the System master.

Figure 3:
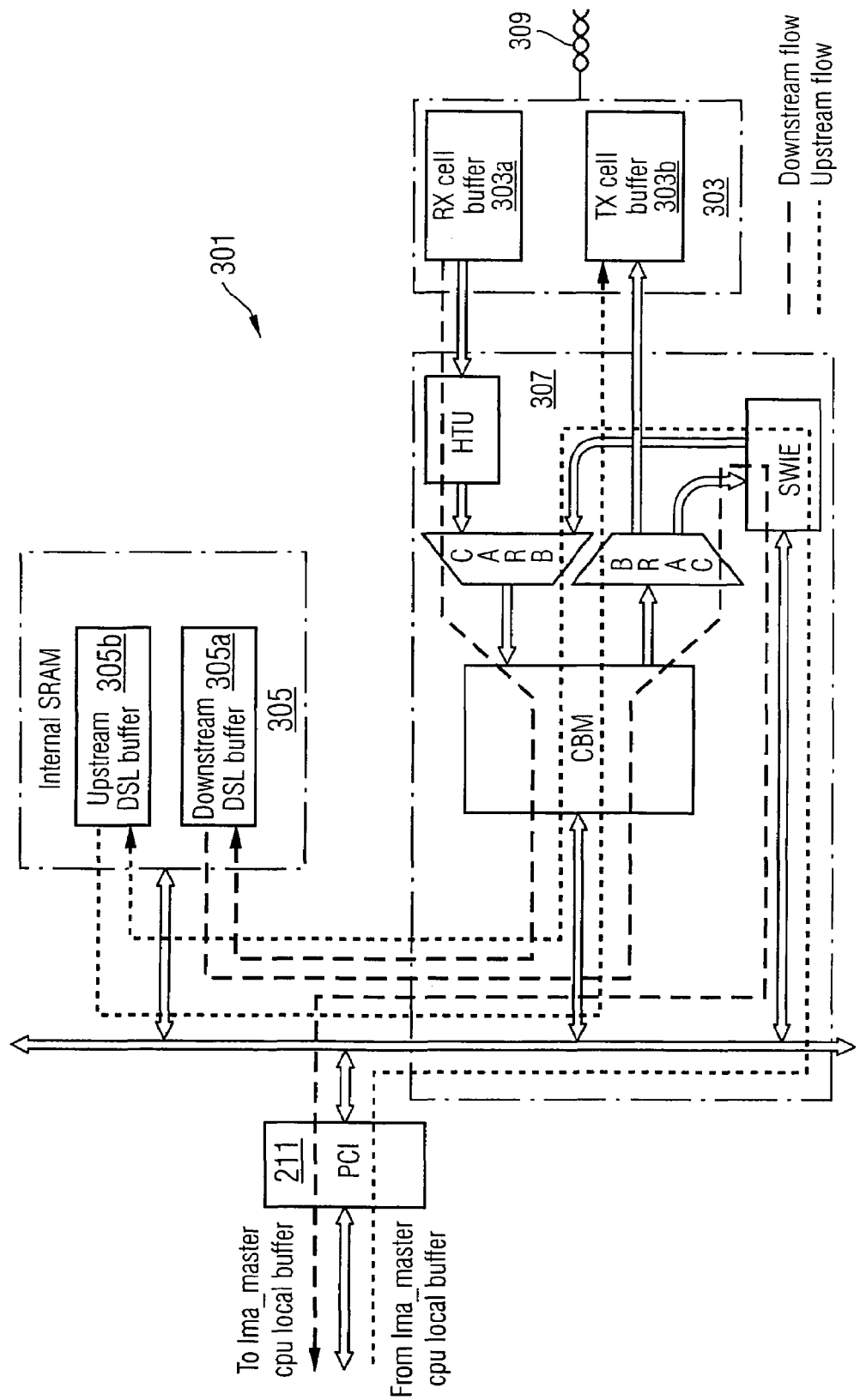
FIG. 3 is a schematic diagram showing the data flow within each Bonding slave of FIG. 2 according to first and second embodiments of the invention.
Figure 4:
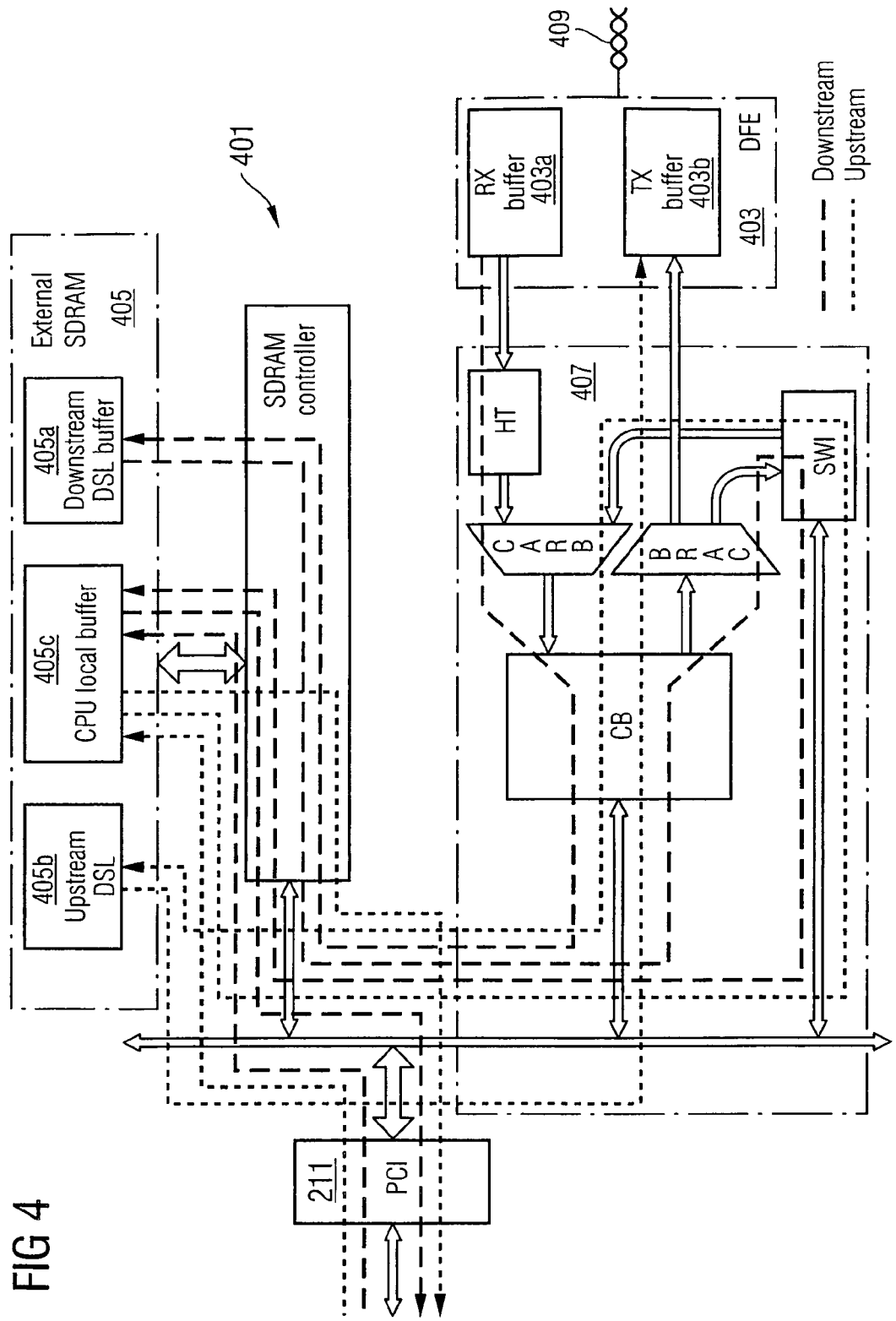
FIG. 4 is a schematic diagram showing the data flow within the Bonding master of FIG. 2 according to the first embodiment of the invention.
Figure 5:
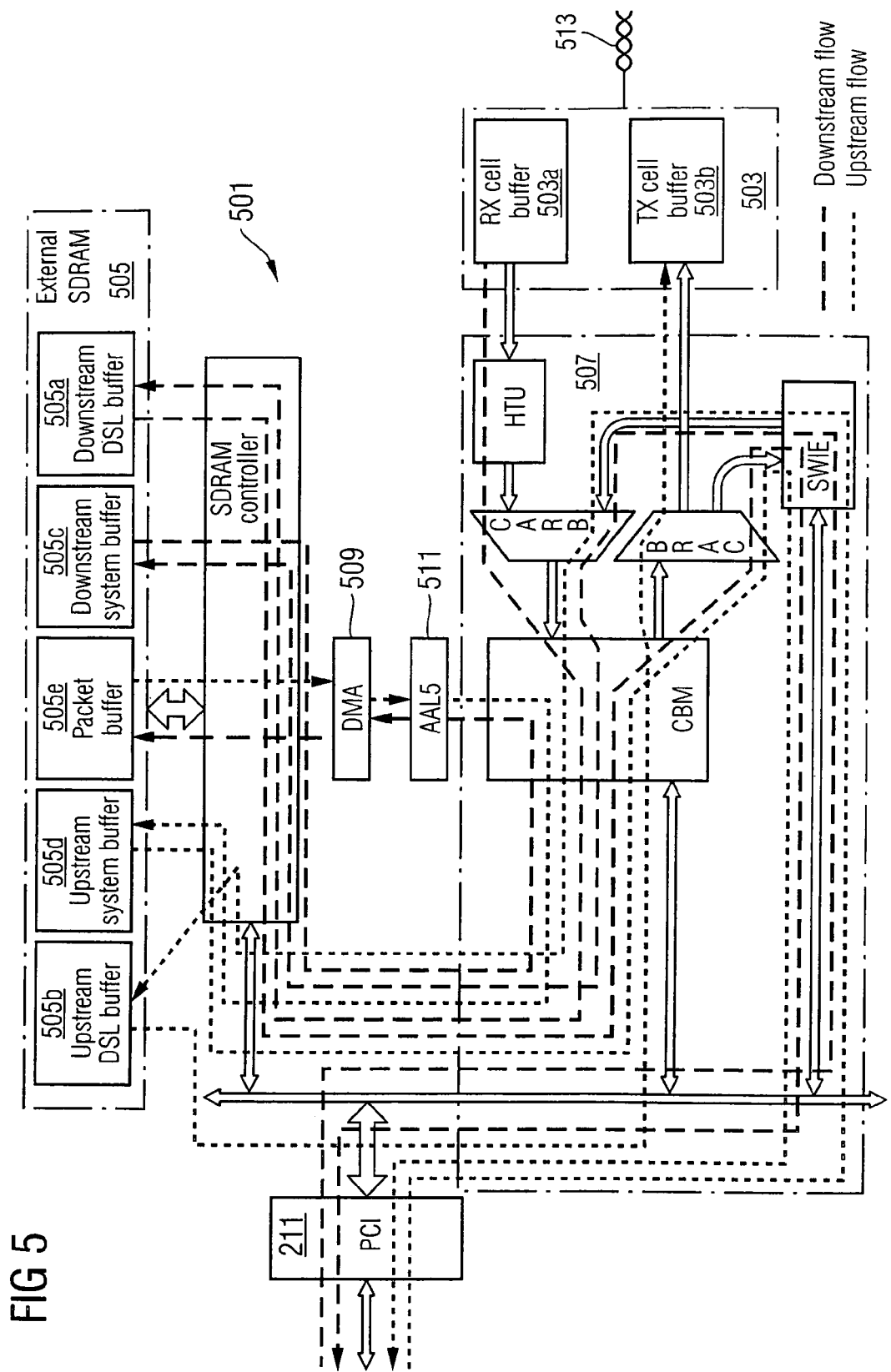
FIG. 5 is a schematic diagram showing the data flow within the System master of FIG. 2 according to the first embodiment of the invention.

Now, for the first embodiment, the data flow in each of the Bonding slaves is shown in FIG. 3, the data flow in the Bonding master is shown in FIG. 4 and the data flow in the System master is shown in FIG. 5.

FIG. 3 shows the data flow in any one of the Bonding slaves of FIG. 2. Within the Bonding slave 301 is a transmitting/receiving block 303 including a receiving buffer 303a and a transmitting buffer 303b, an internal memory (SRAM) 305 including a downstream buffer 305a and an upstream buffer 305b, and a transit block 307. The Bonding slave 301 is connected to its own xDSL line 309 and the PCI bus 211. The receiving and transmitting buffers 303a and 303b are simply buffers for the incoming and outgoing xDSL data respectively. The downstream and upstream buffers 305a and 305b are buffers for the downstream and upstream data respectively. The function of the transit block is to compensate for PCI bus latencies. For our purposes, we can think of the transit block as a black box.

Consider first downstream traffic which is shown with a dashed line. Data comes in from the xDSL line 309 to the receiving buffer 303a in the transmitting/receiving block 303. From there, the data goes to the downstream buffer 305a in the internal SRAM 305 via the transit block 307. From there, the data goes onto the PCI bus 211 via the transit block 307, to be delivered to the Bonding master.

Now consider upstream traffic which is shown with a dotted line. Data comes in from the Bonding master over the PCI bus 211. The data goes to the upstream buffer 305b in the internal SRAM 305 via the transit block 307. From there, the data goes to the transmitting buffer 303b in the transmitting/receiving block 303 and is transmitted over the xDSL line 309

Thus, we see from FIG. 3 that the job of the Bonding slave is simply to transmit data received from the Bonding master along its xDSL line and to send to the Bonding master data received along its xDSL line. The Bonding slave deals with only the lowest layer of the ATM protocol.

FIG. 4 shows the data flow in the Bonding master of FIG. 2. Within the Bonding master 401 is a transmitting/receiving block 403 including a receiving buffer 403a and a transmitting buffer 403b, and a transit block 407. The Bonding master 401 has access to an external memory (SDRAM) 405 (shown within the Bonding master for simplicity) including a downstream buffer 405a, an upstream buffer 405b and a CPU buffer 405c. The Bonding master is connected to its own xDSL line 409 and to the PCI bus 211. The receiving and transmitting buffers 403a and 403b are simply buffers for the incoming and outgoing xDSL data respectively. The downstream and upstream buffers 405a and 405b are buffers for the upstream and downstream data respectively. The CPU buffer is the part of the Bonding master which performs the bonding protocol. i.e. it can receive a single ATM data stream and spread it out over the xDSL channels available and vice-versa.

The function of the transit block is to compensate for PCI bus latencies. Once again, for our purposes, we can think of the transit block as a black box.

Consider first downstream traffic which is shown with a dashed line. Data is incoming from two sources: 1) directly into the Bonding master's receiving buffer 403a in the transmitting/receiving block 403 from xDSL line 409 and 2) from the Bonding slaves and System master via the PCI bus. In both cases, once the data comes into the Bonding master it goes to the downstream buffer 405a in the internal SRAM 405 via the transit block 407. From there, the data goes to the CPU buffer 405c in the internal SRAM via the transit block 407 From there, the data goes onto the PCI bus 211 via the transit block 407, to be delivered to the System master.

Now consider upstream traffic which is shown with a dotted line. Data is incoming from the System master via the PCI bus 211. The data goes to the CPU buffer 405c in the internal SRAM via the transit block 407. The CPU performs the ATM bonding. Data is transmitted from the Bonding master via two routes: 1) directly onto xDSL line 409 from the Bonding master's transmitting buffer 403b in the transmitting/receiving block 403 and 2) onto the PCI bus 211 to be transmitted over separate xDSL lines by the Bonding slaves and System master. The first set of data, on leaving the CPU buffer, goes to the upstream buffer 405b in the internal SRAM 405 via the transit block 407. From there, the data goes to the transmitting buffer 403b in the transmitting/receiving block 403 and is transmitted over the xDSL line 409. The second set of data, on leaving the CPU buffer, goes onto the PCI bus to be delivered to the System master or a Bonding slave, as appropriate.

Thus, it can be seen from FIG. 4 that the job of the Bonding master is to perform bonding functions. The Bonding master implements the ATM bonding layer in the ATM protocol.

FIG. 5 shows the data flow in the System master of FIG. 2. Within the System master 501 is a transmitting/receiving block 503 including a receiving buffer 503a and a transmitting buffer 503b, a transit block 507, a DMA block 509 and an AAL5 block 511. The System master 501 has access to an external memory (SDRAM) 505 (shown within the System master for simplicity) including a downstream xDSL buffer 505a, an upstream xDSL buffer 505b, a downstream system buffer 505c, an upstream system buffer 505d and a packet buffer 505e. The System master is connected to its own xDSL line 513 and to the PCI bus 211. The receiving and transmitting buffers 503a and 503b are simply buffers for the incoming and outgoing xDSL data respectively. The downstream and upstream xDSL buffers 505a and 505b are buffers for the xDSL data and the downstream and upstream system buffers 505c and 505d are buffers for the ATM data. The packet buffer 505e acts as a general buffer for data packets to be routed by the System master. The function of the transit block is to compensate for PCI bus latencies and, for our purposes, we can think of the transit block as a black box. The AAL5 block 511 performs AAL5 layer (ATM Adaptation Layer 5) protocol functionalities and the DMA block 513 is a direct memory access block.

As with FIGS. 3 and 4, downstream traffic is shown with a dashed line and upstream traffic is shown with a dotted line.

Consider firstly low layer traffic which is received and transmitted via transmitting/receiving block 503. Data comes in from the xDSL line 513 to the receiving buffer 503a in the transmitting/receiving block 503. From there, the data goes to the downstream xDSL buffer 505a in the external SDRAM 505 via the transit block 507. From there, the data goes onto the PCI bus 211 via the transit block 307, to be delivered to the Bonding master. In the opposite direction, data comes in from the Bonding master over the PCI bus 211. The data goes to the upstream xDSL buffer 505b in the external SDRAM 507 via the transit block 507. From there, the data goes to the transmitting buffer 503b in the transmitting/receiving block 503 and is transmitted over the xDSL line 509.

Now consider ATM traffic which is received from the Bonding master, processed via the necessary protocol to user data and outputted via the Ethernet (or similar) or user data which is received via the Ethernet (or similar), processed via the necessary protocol to ATM data and outputted to the Bonding master. Both forms of traffic follow the same route, so only one route is shown for simplicity. The data incoming over the PCI bus goes to the downstream system buffer 505c in the external. SDRAM 505 via the transit block 507. The data then goes to the AAL5 block 511 via the transit block. From there, the data goes to the DMA block 509. From there, the data goes to the packet buffer 505e in the external SDRAM 505 and then returns to the DMA block 509 and then to the AAL5 block 511. From there, the data goes to the upstream system buffer 505d in the external SDRAM 505 via the transit block 507. Then the data goes onto the PCI bus via the transit block.

Thus, it can be seen from FIG. 5 that the System master has two jobs. It deals with data at the lowest PHY layer in the ATM protocol and it deals with ATM data and user data at the highest layers.

Consider the operation of the architecture of FIG. 2 according to a second embodiment of the invention.

Firstly, let's consider traffic incoming over the four xDSL lines 201a, 201b, 201c and 201d, i.e. downstream traffic.

Data on line 201a is received by the System master 203. That data is directed to the Bonding master 205 via the PCI bus 211. For this purpose, the System master is implementing only the lowest PHY protocol in the ATM protocol. That is, the System master 203 simply receives incoming xDSL data on line 201a, converts it to ATM in its TC sublayer and sends it to the Bonding master 205.

Data on line 201c is received by the first Bonding slave 207. That data is directed to the Bonding master 205 via the PCI bus 211. The first Bonding slave implements only the lowest PHY protocol in the ATM protocol. That is, the first Bonding slave 207 simply receives incoming xDSL data on line 201c, converts it to ATM in its TC sublayer and sends it to the Bonding master 205.

Data on line 201d is received by the second Bonding slave 209, which works in the same way as the first Bonding slave 207. The incoming data is directed to the Bonding master 205 via the PCI bus 211. The second Bonding slave, like the first Bonding slave, implements only the lowest PHY protocol in the ATM protocol. That is, the second Bonding slave 209 simply receives incoming xDSL data on line 201d, converts it to ATM in its TC sublayer and sends it to the Bonding master 205.

Any further Bonding slaves (for more than four xDSL channels) would work in a similar manner.

xDSL data on line 201b is received directly into the Bonding master.

The Bonding master therefore receives data from all four xDSL channels, data from channels 201a, 201c and 201d coming in via the System master 203, the first Bonding slave 207 and the second Bonding slave 209 respectively and data from channel 201b coming in directly to the Bonding master 205. The Bonding master then performs the ATM bonding to combine the separate strands of data into a single ATM data stream (as usual with ATM bonding, taking account of delays to ensure that the ATM data stream matches the original ATM data stream) i.e. the Bonding master implements the ATM bonding protocol. In this embodiment, the Bonding master also implements the next layers i.e. the ATM layer and the AAL5 layer. The Bonding master then sends the higher layer data (e.g. Encapsulated Ethernet) to the System master via the PCI bus. The System master then performs the necessary protocol and outputs the user data over the appropriate user interface or network (Ethernet, MII, SPI etc). For this purpose, therefore, the System master is implementing only the higher layer and not the ATM protocol.

Secondly, let's consider traffic outgoing over the four xDSL lines 201a, 201b, 201c and 201d, i.e. upstream traffic.

User data is received by the System master 203 from, for example, the Ethernet. The System master performs the necessary protocol and sends the processed data to the Bonding master 205 via the PCI bus 211. Thus, for this purpose, the System master 203 is implementing only the higher layer protocols and not the ATM protocol. The Bonding master 205 is responsible for the AAL5 layer and the ATM layer as well as the ATM bonding layer i.e. splitting the ATM data up to spread it over the four available xDSL channels. Thus, in this embodiment, the Bonding master implements the ATM bonding protocol as well as the two higher layers: the ATM protocol and the AAL5 protocol. (It should be understood that, if there were more or fewer xDSL channels available, the Bonding master would spread the data over the appropriate number of xDSL channels.)

The Bonding master 205 sends data for one of the channels to the System master 203 via the PCI bus 211. The System master 203 transmits the data on xDSL line 201a. For this purpose the System master 203 is implementing only the lowest PHY protocol in the ATM protocol. That is, the System master 203 simply receives data from the Bonding master 205, coverts it to xDSL in its TC sublayer and transmits it over the xDSL line 201a.

The Bonding master sends data for another of the channels to the first Bonding slave 207 via the PCI bus 211. The first Bonding slave 207 transmits the data on xDSL line 201c. The first Bonding slave implements only the lowest PHY protocol in the ATM protocol. That is, the first Bonding slave simply receives xDSL data from the Bonding master 205, converts it to xDSL in its TC sublayer and transmits it over the xDSL line 201c.

The Bonding master sends data for another of the channels to the second Bonding slave 209 via the PCI bus 211. The second Bonding slave 209 transmits the data on xDSL line 201d. Like the first Bonding slave, the second Bonding slave implements only the lowest PHY protocol in the ATM protocol. That is, the second Bonding slave simply receives xDSL data from the Bonding master 205, converts it to xDSL in its TC sublayer and transmits it over the xDSL line 201d.

Any further Bonding slaves (for more than four xDSL channels) would work in a similar manner.

The Bonding master transmits data for the last of the four channels directly onto xDSL line 201b.

Thus, it may be seen that, for the operation of the second embodiment, the lowest PHY protocol in the ATM protocol is implemented by the System master, the Bonding master and each of the Bonding slaves. This is the same as the first embodiment. The next protocol, the ATM bonding protocol is implemented by the Bonding master as it spreads the ATM data over the four xDSL channels or recombines the data from the four xDSL channels into a single data stream. The next protocols, the ATM protocol and the AAL5 protocol are also implemented by the Bonding master, with only the higher layer protocols being implemented by the System master.

It will be appreciated that in both the first and second embodiments, the Bonding slaves implement only the lowest PHY layer in the ATM protocol. Therefore, the data flow in an Bonding slave, which is shown in FIG. 3 applies to both the first and second embodiments.

For the second embodiment, the data flow in the Bonding master is exactly like that shown in FIG. 4 except that the Bonding master additionally includes an AAL5 block for implementing the ATM and AAL5 protocols.

For the second embodiment, the data flow in the System master is exactly like that shown in FIG. 5 except that the System master does not include the AAL5 block, as the ATM protocol and the AAL5 protocol are now being implemented in the Bonding master rather than in the System master.

It will be appreciated that, for both embodiments, the second unit in the form of the System master deals with the higher layer protocols and the first unit in the form of the Bonding master deals with the bonding processes i.e. implements the ATM bonding layer. The lowest PHY layers are implemented by both the first and second units and any other units, in the form of Bonding slaves. The intermediate (e.g. the ATM layer and the AAL5 layer) may be handled by either the Bonding master or the System master or a combination of both. In the first embodiment described above, the System master deals with the ATM layer and the AAL5 layer and in the second embodiment the Bonding master deals with the ATM layer and the AAL5 layer, but it will be appreciated by the skilled person that implementation of the intermediate layers can be handled by any combination of the first and second units according to requirements.

It can be seen from the above detailed description of the embodiments of the invention, that the invention provides an improvement over the known arrangements. Firstly, the System master is not interrupted for bonding processes, as the Bonding master deals with all the Bonding processes. Secondly, the PCI bus provides an interface which is flexible for interconnecting, scalability and memory sharing and is easily available. Thirdly, data and control are exchanged via one common interface. The approach, based usually on multiple chips on a PCI bus is a flexible and highly efficient system.

While the preferred embodiments of the invention have been illustrated and described, it will be appreciated that various changes can be made therein without departing from the spirit and scope of the invention as defined by the appended claims.

We claim:

1. Apparatus for ATM bonding, the apparatus comprising:
   an ATM bonding master unit having a first xDSL line directly connected thereto;
   a system master unit having a second xDSL line directly connected thereto, the system master unit being connected to a user unit;
   a bus connecting the ATM bonding master unit and the system master unit, the ATM bonding master unit being arranged to convert one incoming ATM data stream received by the system master unit to at least two data streams for transmitting on the first and second xDSL lines respectively and to convert at least two data streams incoming on the first and second xDSL lines respectively to one ATM data stream for delivery to the system master unit and subsequent transmission by the system master unit.

2. The apparatus of claim 1 wherein the system master unit is further directly or indirectly connected to a user unit.

3. The apparatus of claim 1 further comprising a first bonding slave having a third xDSL line directly connected thereto, the first bonding slave connected to the ATM bonding master unit and the system master unit via the bus, the ATM bonding master unit being arranged to convert the incoming ATM data stream to at least three data streams for transmitting on the first, second and third xDSL lines respectively and to convert at least three data streams incoming on the first, second and third xDSL lines respectively to the one ATM data stream for delivery to the system master unit and subsequent transmission by the system master unit.

4. The apparatus of claim 3 further comprising a second bonding slave having a fourth xDSL line directly connected thereto, the second bonding slave connected to the ATM bonding master unit and the system master unit via the bus, the ATM bonding master unit being arranged to convert the incoming ATM data stream to at least four data streams for transmitting on the first, second, third and fourth xDSL lines respectively and to convert at least four data streams incoming on the first, second, third and fourth xDSL lines respectively to the one ATM data stream for delivery to the system master unit and subsequent transmission by the system master unit.

5. The apparatus of claim 1 wherein the system master unit and the ATM bonding master unit are on one chip.

6. The apparatus of claim 1 wherein the system master unit and the ATM bonding master unit are on separate chips.

7. The apparatus of claim 1 wherein the bus connecting the ATM bonding master unit and the system master unit is a PCI bus.

8. A method for ATM bonding, the method comprising:
receiving an incoming ATM data stream at a system master unit;
sending the incoming ATM data stream to an ATM bonding master unit via a bus;
performing ATM bonding at the ATM bonding master unit by converting the incoming ATM data stream into a plurality of data streams;
transmitting from the ATM bonding master unit a first one of the plurality of data streams over a first xDSL line directly connected to the ATM bonding master unit;
sending a second one of the plurality of data streams from the ATM bonding master unit to the system master unit via the bus;
transmitting from the system master unit the second one of the plurality of data streams over a second xDSL line connected to the system master unit;
converting at least two data streams received on the first and second xDSL lines respectively to an outgoing ATM data stream;
sending the outgoing ATM data stream to the system master unit via the bus; and
transmitting the outgoing ATM data stream from the system master unit.

9. A method according to claim 8 wherein the system master unit is directly or indirectly connected to a user unit.

10. A method according to claim 8 further comprising:
sending a third one of the plurality of data streams from the ATM bonding master unit to a third unit via the bus; and
transmitting the third one of the plurality of data streams over a third xDSL line connected to the third unit.

11. A method according to claim 10 further comprising the steps of:
sending a fourth one of the plurality of data streams from the ATM bonding master unit to a fourth unit via the bus; and
transmitting the fourth one of the plurality of data streams over a fourth xDSL line connected to the fourth unit.

12. A method according to claim 8 wherein the ATM bonding master unit and the system master unit are on one chip.

13. A method according to claim 8 wherein each unit is on a separate chip.

14. A method according to claim 8 wherein the bus is a PCI bus.

* * * * *